Dec. 30, 1924.                                                                       1,520,745
J. A. BOWDEN
PRESSURE LUBRICATING DEVICE
Filed Aug. 18, 1923
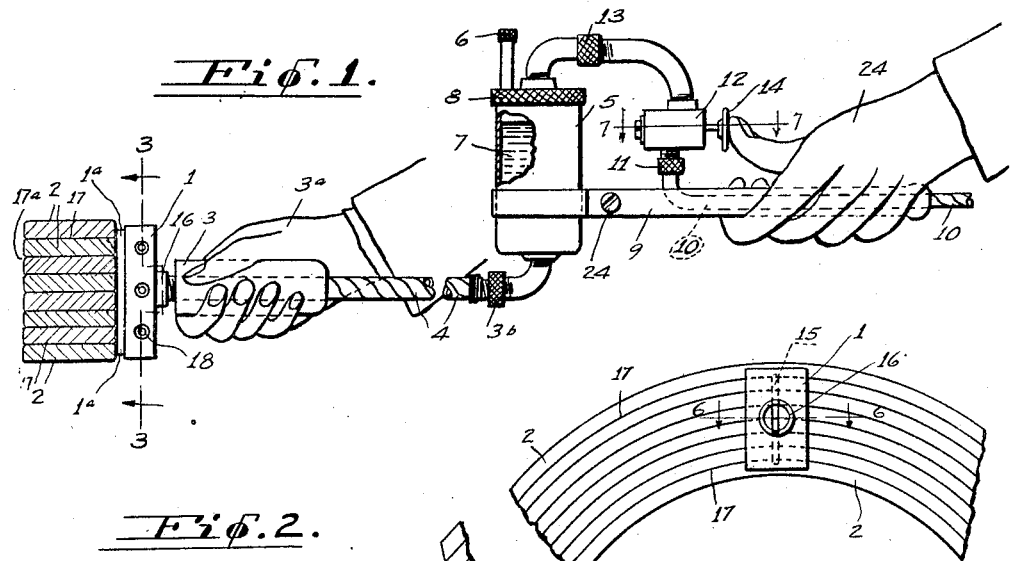
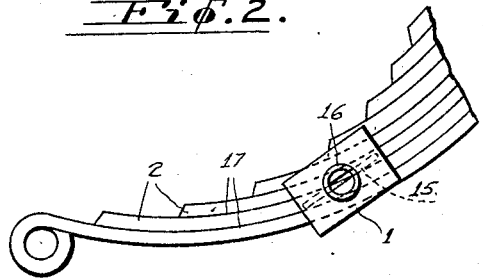
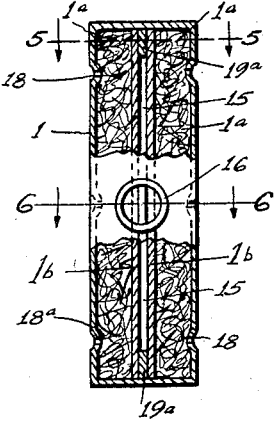
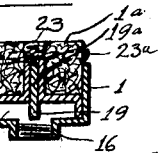
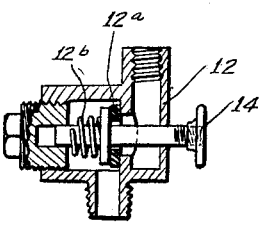
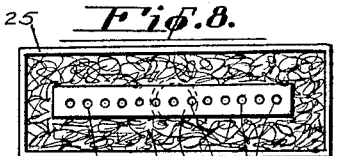
Inventor
Junius A. Bowden Patented Dec. 30, 1924.

1,520,745

UNITED STATES PATENT OFFICE.

JUNIUS A. BOWDEN, OF LOS ANGELES, CALIFORNIA.

PRESSURE-LUBRICATING DEVICE.

Application filed August 18, 1923. Serial No. 658,165.

*To all whom it may concern:*

Be it known that I, JUNIUS A. BOWDEN, a citizen of the United States, residing at Los Angeles, in the county of Los Angeles, State of California, have invented new and useful Improvements in a Pressure-Lubricating Device, of which the following is a specification.

This invention relates to a portable pressure lubricating device, adapted for lubricating leaves of laminated springs or for such other parts as it may be used.

The main object is to provide a pressure lubricating system embodying a nozzle like device having a cushion or flexible border, the latter being adapted to maintain a concentration of the force of the lubricant discharge and prevent the lubricant escaping beyond the border.

A very important object of the invention is to provide means whereby a spring actuating valve may be intermittently operated, for governing the outlet discharge of the nozzle, by a person's hand while the hand is engaged, at the same time, in supporting other means associated with the nozzle leading to the discharge.

Another object is to provide such construction that may be adaptable to form a nozzle from stamping parts comprising its construction.

Other objects of the invention will be disclosed in the drawings, specifications and claims.

Fig. 1 is a side elevation showing the system substantially in complete form, including its application to edges of leaves in a laminated spring.

Fig. 2 shows one form of a laminated spring and an indication of the nozzle applied in different positions upon the edges of the leaves.

Fig. 3 is a plan view of the nozzle in longitudinal section along the line 3—3 of Fig. 1.

Fig. 4, a detail or division part of the nozzle.

Fig. 5, shows a view partially on the line 5—5 of Fig. 3 and partially on a central line through the center of part 16.

Fig. 6, a cross section of the nozzle along the line 6—6 of Figs. 2 and 3.

Fig. 7 is a cross section along the line 7—7 of the spring actuating valve 12, shown in Fig. 1.

Fig. 8 is a plan view of a modified form of a nozzle, looking at its face.

Referring to numerals in the drawings: 1 is a housing for nozzle and other parts; $1^a$, is a flexible or cushion border; $1^b$, jaws of the nozzle; 2, laminated spring leaves; 3, handle to the nozzle; $3^b$, coupling; 4, flexible tube; 5, lubricant container; 6, filler cap; 7, indicates a lubricant; 8, removable head; 9, handle for the container; 10, compressed air supply tube; 11, coupling; 12, spring actuating valve; 13, coupling; 14, push button to control lubricant discharge; 15, discharge opening or jet of the nozzle; 16, inlet to nozzle; 17, division line between the leaves; $17^a$, recess between edges of the leaves; 18, perforation; $18^a$, identation surrounding the perforation; 19, detail of division part for nozzle construction; 20, base partition or construction member for nozzle; 21, inlet chamber of nozzle; 22, longitudinal open space between the inner walls of the border; 23, flexible insert; $23^a$, binding thread to secure flexible insert from displacement; in Fig. 8, modified form, 25, a plan view of the face of the nozzle; 26, inlet to nozzle; 27, discharge openings or perforations; 28, flexible or cushion border.

Referring to the different drawings, Fig. 1 shows an inlet tube 10, to supply compressed air. This supply may come from storage in a compressed air tank or otherwise. The tube enters a handle 9, and comes out the handle where it is shown connected by coupling 11, to the spring actuating valve 12. This valve opens by pressing the button 14, and closes by action of the spring $12^b$, (see Fig. 7) when the button is released.

The container 5 is supplied with oil through filler cap 6, or by removal of the head 8. At the bottom of the container is an outlet tube 4. This tube passes through the nozzle handle 3. The latter is intended to support the nozzle when held by hand $3^a$, as shown. The nozzle has a very long narrow mouth or slot opening 15, and a flexible or cushion border $1^a$. This border extends outwardly or beyond the opening of the nozzle and casing 1.

The object of the extending flexible border is to form a cushion wall along the discharge opening of the nozzle, adapted to prevent the lubricant spreading and losing its force, particularly along the sides or narrow mouth portion of the nozzle, so as to make the discharge more effective in shooting between the leaves.

It should be understood that quite a little pressure should be exerted on the handle of the nozzle when the nozzle is in a vertical position as shown in Fig. 1, so as to close up the small recesses 17ª. These recesses are formed on account of the leaves of the springs having somewhat rounded edges, but owing to the border acting as a pad or cushion, it will readily yield when pressed against the sides of the leaves and practically close the recesses and thus permit the full charge from the nozzle to go directly through the division between the leaves to their opposite sides.

Figs. 3, 4, 5 and 6 furnished a very good idea of how the nozzle is constructed and how its several parts cooperate together. The housing 1, of the nozzle, and members or parts 19—20, all forming the nozzle, also form a channel or pocket around the nozzle, the latter being separated from the interior of the nozzle. The object of this channel is to provide a suitable holding means and seat for the flexible border. It will be observed in Figs. 5 and 6, showing cross sections at different portions of the nozzle, the channel is deep, wide, and has a flat bottom, and all walls are perpendicular. The sides of the exterior wall have perforations 18, and these perforations are pressed inwardly, forming inner projections or indentations, 18ª.

Fig. 7 shows a sectional view of the spring actuating valve 12 (see Fig. 1). This is an ordinary valve construction; a different form may be used if desired. In this form 14 indicates a push button; 12ª, coil spring, and 12ᵇ, a flexible seat. In operation the valve is opened by pressing the button (as indicated in Fig. 1); this action also compresses the spring. The valve closes by expansion of the spring when pressure is released from the button. Any type of spring actuating valve, in the combination, comes within the scope of my invention.

All the metal parts shown in Figs. 3, 4, 5, and 6 are intended to be stamped from thin sheet metal. In constructing the nozzle from the stampings, part 20 is of angular or zigzag formation as shown, there being two of these parts, one opposite the other. These two parts engage each end 19ᵇ of part 19, as best shown in Fig. 3. These parts are assembled in casing 1, and thus form the nozzle and channel. The channel is intended to be oil tight at its bottom.

It will be observed this construction forms a long narrow discharge slot 15. The slot does not exceed $\frac{1}{32}$ inch wide, and is 1¾ inches long, therefore the slot is more than fifty times longer than it is wide. The construction is intended to form a distributing chamber 21. Part 19 is located centrally over the inlet 16, and acts to divert or spread the lubricant, otherwise the lubricant commingled with air would enter directly in the center of the slot, and would not be evenly distributed. In Fig. 6 a cross section of part 19 shows it extends upward from the inlet of nozzle, leaving a narrow passageway on each side of 19, thus providing for dividing the lubricant as it discharges into the slot 15. This also helps to make a more uniform distribution of the lubricant through the slot.

The object of the perforations 18 and indenture 18ª in the exterior side walls of housing 1, is to provide means for holding the padding or border from displacement. Between the borders, at their ends, a small space is formed. This, however, is not particularly objectionable, owing to the fact that the discharge slot of the nozzle is more than fifty times longer than its width, and as the slot does not extend the full length of the borders, the small space formed will be of little consequence. However, provision is made to close this space by inserting a piece 23, of the same material as the side borders, and securing it in place by threads 23ª. I do not limit myself to a border that fully surrounds the nozzle opening.

Some variation in construction of the nozzle could be made without departing from the scope of my invention. For instance, if a nozzle was provided with a flexible border and had a long row of small perforations 27, as shown in modified form as of Fig. 8, it would amount to an equivalent of my nozzle.

The handle 9 of the container is a stamping formed from sheet metal. It is secured in place by bolt means 24, which clamps the handle firmly to the container. The end beyond the bolt is formed rounding. The handle 3 of the nozzle is preferably a wood turning, with an opening through its length to provide for the tube 4. The handle is secured to the tube in any suitable manner.

It should be understood that I do not limit myself to placing the spring actuating valve on the line leading to the container to make the system operable by one person. This valve may be placed adjacent the handle to the nozzle and operated substantially as in the preferred form. Therefore, such a slight change as to locate the spring actuating valve (which controls the discharge) anywhere in the system where it can be operated by the same hand that supports an important part of the construction comprising the device, would come within the scope of my invention.

In operating my pressure lubricating device the container is partially filled with oil, one hand is placed on the handle 9 of the container, and the other hand on the handle 3 of the nozzle. When the nozzle is applied to the edges of numerous leaves as shown in Fig. 1, the operator may then press his thumb on the button 14. This will cause the lubricant to shoot, by force of the air, between the leaves where the nozzle is held. The nozzle may be held in a vertical or diagonal position, as indicated in Fig. 2, or it may be moved along for a considerable distance and continue to discharge lubricant so long as the button is depressed, or the button may be pressed intermittently to suit conditions.

At the end of the springs where there are but two leaves, the nozzle can be held centrally, in a parallel position with the leaves, and in this position the face of one side of the border of the nozzle will bear against the edge of one leaf and the face of the border on the opposite side will bear against the edge of the other leaf, while the opening in the nozzle will be in alignment with the division between the leaves; therefore it is plain to see how the device may be operated to lubricate at the narrowest width of the edges of the springs.

What I claim is:

1. A pressure lubricating device, comprising an elongated nozzle having a cushion border projecting laterally and longitudinally of the discharge opening in the nozzle, means adapted for connecting the nozzle to a source of lubricant supply.

2. In a lubricating device, comprising a long narrow slot like opening provided with a cushion border on each side of the slot, the border extending outwardly beyond said opening, said border adapted to yield to pressure and form a closure at the sides of the slot when pressed upon surfaces to be lubricated, means for connecting said device to a lubricant supply.

3. A pressure lubricating device, comprising a nozzle having a very narrow and long slot like discharge opening, a cushion border lengthwise on each side of the slot, said border projecting in a longitudinal direction beyond the discharge end of the nozzle, means adapted for connecting the nozzle to a source of lubricant supply.

4. A pressure lubricating device, comprising a nozzle having an elongated or the like discharge opening, a cushion border extending laterally along each side of said opening and the border projecting longitudinally beyond the jaws of said nozzle, a source of compressed air and a lubricant container and means for admitting said air to the container, means for connecting the nozzle to the container.

5. A pressure lubricating device, comprising a nozzle having an elongated or the like discharge opening, a cushion border extending laterally along each side of said opening and the border projecting longitudinally beyond the jaws of said nozzle, a spring actuating valve adapted to control the discharge from said nozzle, said valve adapted to be opened by push button means or the like and closed by action of said spring, means of a source of compressed air and a lubricant container and means for admitting said air to the container, means for connecting the nozzle to the container.

6. A pressure lubricating device, comprising an elongated nozzle provided with a narrow opening, a walled channel extending laterally and parallel with the discharge opening in the nozzle, a cushion border in said channel, means adapted for connecting the nozzle to a source of lubricant supply.

7. A pressure lubricating device, comprising an elongated nozzle provided with a narrow opening, a walled channel extending laterally and parallel with the discharge opening in the nozzle, the exterior walls of the channel having perforations, means adapted for connecting the nozzle to a source of lubricant supply.

8. A pressure lubricating device, comprising a nozzle having an elongated or the like discharge opening, a walled channel extending laterally and parallel with said opening, the exterior walls of the channel formed with indentures extending inwardly, said channel adapted for housing a cushion border, means for connecting the nozzle to a source of lubricant supply.

9. In a pressure lubricating device, comprising a source of compressed air and a lubricant container and means for admitting said air to the container, a hand support secured to said container, a spring actuating valve adapted to control said air, a nozzle having an inlet and an outlet, a flexible border on each side of the outlet, means for connecting said inlet to the container, said valve adapted to control the discharge from said outlet.

In testimony whereof, I have hereunto set my hand at Los Angeles, California, this 13th day of August, 1923.

JUNIUS A. BOWDEN.